(12) United States Patent
Muzzy et al.

(10) Patent No.: US 7,798,241 B2
(45) Date of Patent: Sep. 21, 2010

(54) MECHANICAL HITCH CONTROL UNIT

(75) Inventors: Norman Everett Muzzy, Cedar Falls, IA (US); David Leo Sigl, Waterloo, IA (US); Shawn Robert Simons, Cedar Falls, IA (US); Jesse Ray Knight, Waterloo, IA (US)

(73) Assignee: Deere & Company, Moline, IL (US)

( * ) Notice: Subject to any disclaimer, the term of this patent is extended or adjusted under 35 U.S.C. 154(b) by 4 days.

(21) Appl. No.: 12/233,863

(22) Filed: Sep. 19, 2008

(65) Prior Publication Data

US 2010/0071919 A1 Mar. 25, 2010

(51) Int. Cl.
 *A01B 63/112* (2006.01)
(52) U.S. Cl. .......................... 172/7; 172/239
(58) Field of Classification Search .............. 172/7, 172/9, 239
 See application file for complete search history.

(56) References Cited

U.S. PATENT DOCUMENTS

| | | | | | |
|---|---|---|---|---|---|
| 2,921,638 | A | * | 1/1960 | Du Shane | 172/9 |
| 3,142,342 | A | * | 7/1964 | Brudnak, Jr. et al. | 172/9 |
| 3,275,084 | A | * | 9/1966 | Bunting | 172/9 |
| 3,314,484 | A | * | 4/1967 | Bunting et al. | 172/9 |
| 3,455,397 | A | * | 7/1969 | Nelson et al. | 172/9 |
| 3,489,224 | A | * | 1/1970 | Bunting | 172/9 |
| 3,613,798 | A | * | 10/1971 | Mohan et al. | 172/9 |
| 3,653,446 | A | * | 4/1972 | Kalmon | 172/4 |
| 3,732,933 | A | * | 5/1973 | Foxwell et al. | 172/9 |
| 3,768,570 | A | * | 10/1973 | Green | 172/9 |
| 3,918,527 | A | * | 11/1975 | Wagner | 172/9 |
| 4,091,877 | A | | 5/1978 | Berg | |
| 4,206,813 | A | * | 6/1980 | Mueller et al. | 172/7 |
| 4,286,669 | A | * | 9/1981 | Lasoen | 172/7 |
| 4,293,040 | A | * | 10/1981 | O'Connor | 172/7 |
| 4,499,775 | A | * | 2/1985 | Lasoen | 73/862.57 |
| 4,503,916 | A | * | 3/1985 | Wiegardt | 172/3 |
| 4,518,045 | A | * | 5/1985 | Nelson | 172/7 |
| 4,817,726 | A | | 4/1989 | Becker | |
| 2006/0016609 | A1 | * | 1/2006 | Chauvel | 172/7 |

OTHER PUBLICATIONS 5520,5320,5420, and 5520 Tractors, Operator'Manual; John Deere Augusta Works; Rockshaft and 3-Point Hitch; Copyright 2004; Moline, IL.
5220, 5320, 5420 and 5520 Tractor Operation and Test Technical Manual; John Deere Augusta Works; Theory of Operation; Copyright 2005; Moline, IL.
5220, 5320, 5420, and 5520 Tractor Repair Technical Manual; John Deere Augusta Work; Rockshaft; Copyright 2005; Moline, IL.

* cited by examiner

*Primary Examiner*—Thomas B Will
*Assistant Examiner*—Jamie L McGowan (57) ABSTRACT

A mechanical hitch control system for a vehicle includes a draft force sensing member, a mechanical hitch control unit, a hitch valve actuator, and a cable transmitting a draft force signal to the hitch control unit. A draft cam is coupled to the draft force sensing and setting members. A position cam is coupled to the position setting member and to a hitch position sensing member. A draft pickup cam is coupled to the draft cam and pivotally mounted on the hitch position setting member. At least one of the cams is operatively engagable with the hitch valve actuator. The cams are enclosed by housing with an opening covered by a removable side plate. The cams and levers are coupled to input members which are inserted through the side plate. The assembled cams, levers and input members are then installed into the housing through the opening.

10 Claims, 6 Drawing Sheets

MECHANICAL HITCH CONTROL UNIT

FIELD OF THE INVENTION

The present invention relates to a hitch control system with a mechanical valve control unit.

BACKGROUND OF THE INVENTION

It is known to provide agricultural tractors with a mechanical draft and position sensing system for controlling a hitch to which implements may be attached, such as described in U.S. Pat. Nos. 4,817,726 and 4,091,877. Most low horsepower tractors use top link draft force sensing because lower link draft sensing is difficult to implement on a low horsepower tractor due to space constraints. But, top link draft force sensing does not work well under high draft loads with certain types of implements.

Some current production John Deere tractors, such as all Series Model 5000 and 03 and 05 Series Model 6000 tractors, have a mechanical hitch or rockshaft control unit which has levers or cams which operate the spool of a hitch control valve. Such units have been difficult to assemble since many small parts must be mounted on sleeves or shafts on the inside of a rockshaft cylinder housing. Such production systems also have required a complicated set of linkages to transmit sensed draft force from the upper draft link to the hitch control unit.

SUMMARY OF THE INVENTION

Accordingly, an object of this invention is to provide an improved hitch control system.

A further object of the invention is to provide such a system which has a hitch control unit which is simple to assemble.

Another object of the invention is to provide such a system which has lower link draft sensing and which transmits sensed draft force with a simple mechanism.

These and other objects are achieved by the present invention, wherein a hitch control system is provided for a utility vehicle having a hitch with upper and lower links. The hitch control system includes a draft force sensing member, a mechanical hitch control unit, a hitch lift cylinder hydraulic valve, and a cable transmitting a draft force signal from the sensing member to the hitch control unit. The draft force sensing member is coupled to the lower links. The hitch control unit includes a draft cam coupled to the draft force sensing member and coupled to a draft force setting member. The hitch control unit also includes a position cam coupled to the hitch position setting member and coupled to a hitch position sensing member. The hitch control unit also includes a pickup cam pivotally coupled to the draft cam and pivotally mounted on the hitch position setting shaft. The position cam and the draft cam are operatively engagable with the hitch directional spool valve. The cams are enclosed in a housing comprising a main housing having an opening in a side thereof covered by a removable side plate. The cams and levers are coupled to input shafts which are inserted through the side plate. The assembled cams, levers and input shafts with side plate are then installed into the main housing through the opening.

A hitch control unit acts upon the hydraulic valve to allow the operator to command a position control or a draft control. When the hitch is raised to it's uppermost position, the draft sensing cam is lifted away from the valve by a pin on the position feedback lever.

The hitch lower link draft forces are sensed by a bending bar, pivoting on the crown of tapered bushings, with a multiplying lever signal pickoff. The motion of the lever is transferred to a light cable system which transfers the signal to the draft control mechanism. Using a cable simplifies the routing and positioning constraints.

DESCRIPTION OF THE PREFERRED EMBODIMENT

Figure 1:
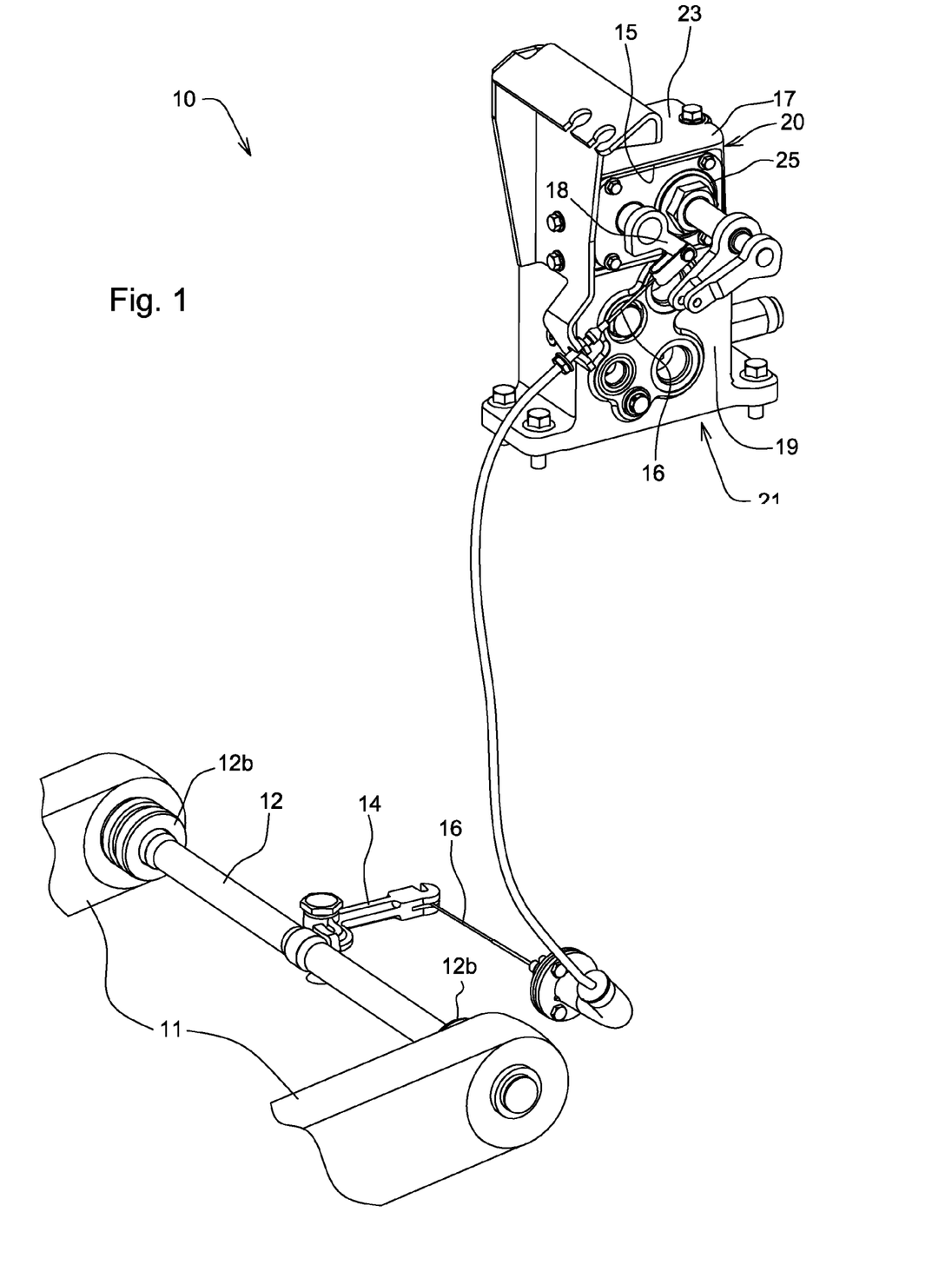
FIG. 1 is a perspective view of hitch control system embodying the invention.

Referring to FIG. 1, a hitch system 10 includes a draft force sensing bar 12. Lower draft links 11 are coupled to the outer ends of bar 12. Draft forces applied to the bar 12 by the draft links deflects the center portion of the bar by pivoting on the crowns (not shown) of tapered bushings 12b. An L-shaped pivoting draft force sensing lever 14 transmits this deflection to a cable 16. Cable 16 transmits this deflection to a sensed draft force input lever 18 of a mechanical hitch control unit 20. Hitch control unit 20 includes a hollow housing 17 mounted to a housing 19 of a hitch valve unit 21. Housing 17 includes a main housing 23 with a side opening 15 covered by a removable side plate 25.

Figure 2:
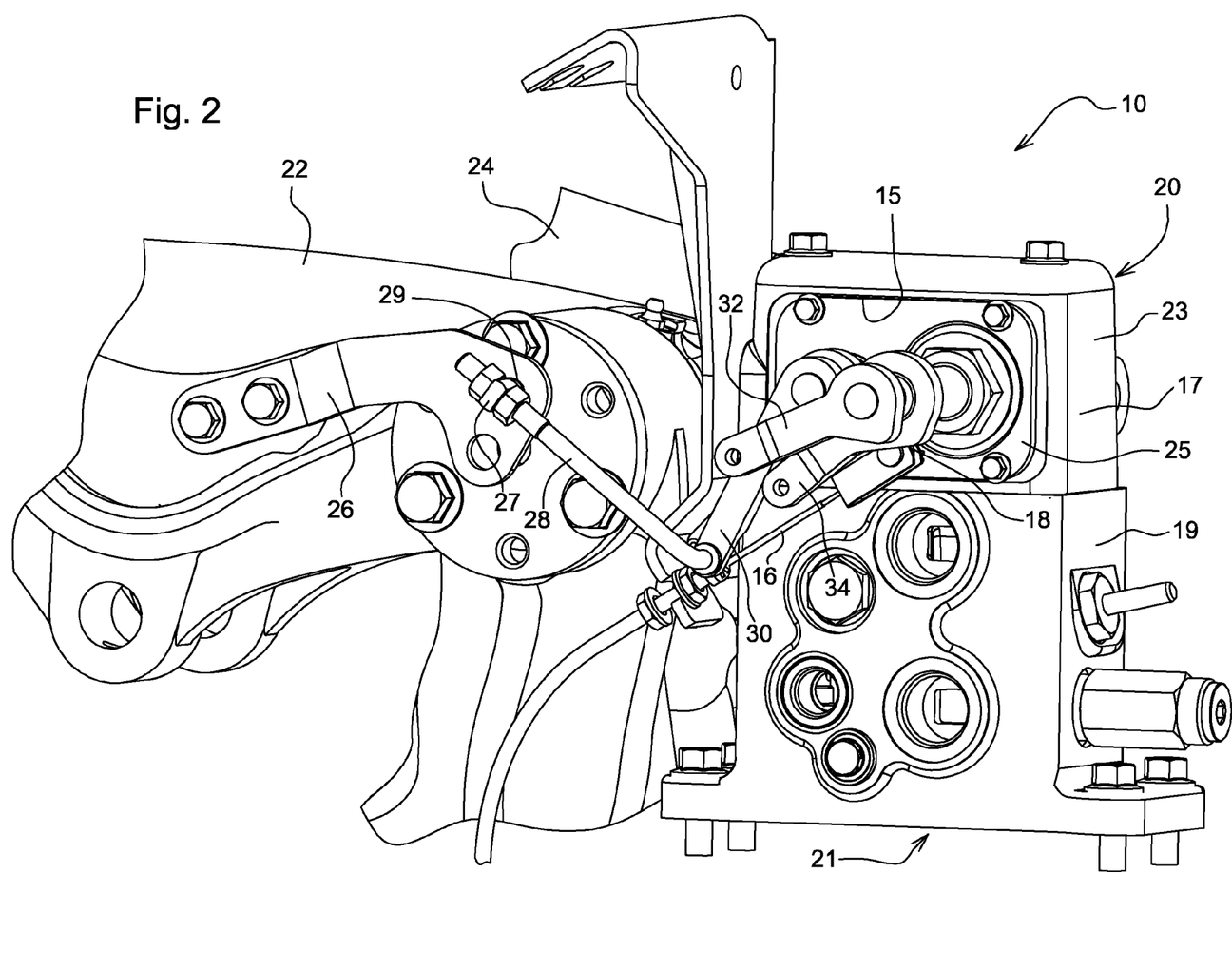
FIG. 2 is a detailed perspective side view of a portion of FIG. 1.

As best seen in FIG. 2, the hitch system 10 also includes conventional pivoting hitch lift arms 22 and 24. The pivoting (or the position) of the lift arms 22 and 24 is transmitted by a bracket 26 to a rod 28, and by rod 28 to a sensed position input lever 30 of the hitch control unit 20. Rod 28 is pivotally coupled to bracket 26 by a pivot pin 27 which is rotatably received by a bore 29 in the end of bracket 26. Hitch control unit 20 also includes an operator controlled position setting lever 32 which is coupled by a conventional cable linkage (not shown) to a conventional hitch control position setting member (not shown) in a cab console or operator station. Hitch control unit 20 also includes an operator controlled draft force setting lever 34 is coupled by a conventional cable linkage (not shown) to a conventional hitch control draft force setting lever (not shown) in a cab console or operator station.

Figure 3:
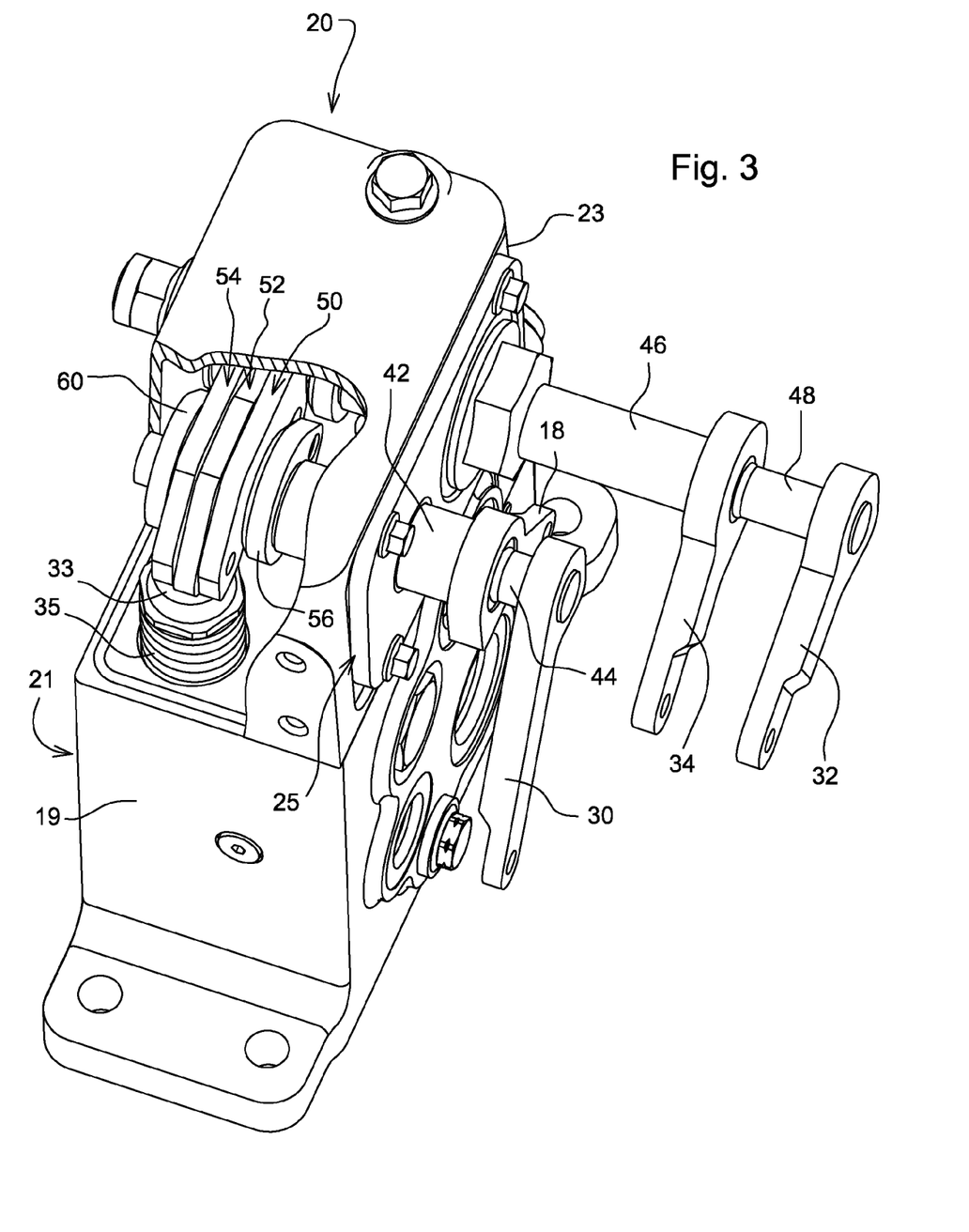
FIG. 3 is a top perspective view of the hitch control unit of FIG. 1 with a portion of the housing removed.

Referring now to FIG. 3, a hitch directional valve spool 33 projects up from the top of hitch valve unit 21. A spring 35 urges spool 33 upwards and towards hitch control unit 20. The movement of spool 33 directs oil flow within the conventional hitch control valve unit 21. The hitch control valve controls conventional lift cylinders (not shown) which raise and lower the lift arms 22 and 24.

Figure 4:
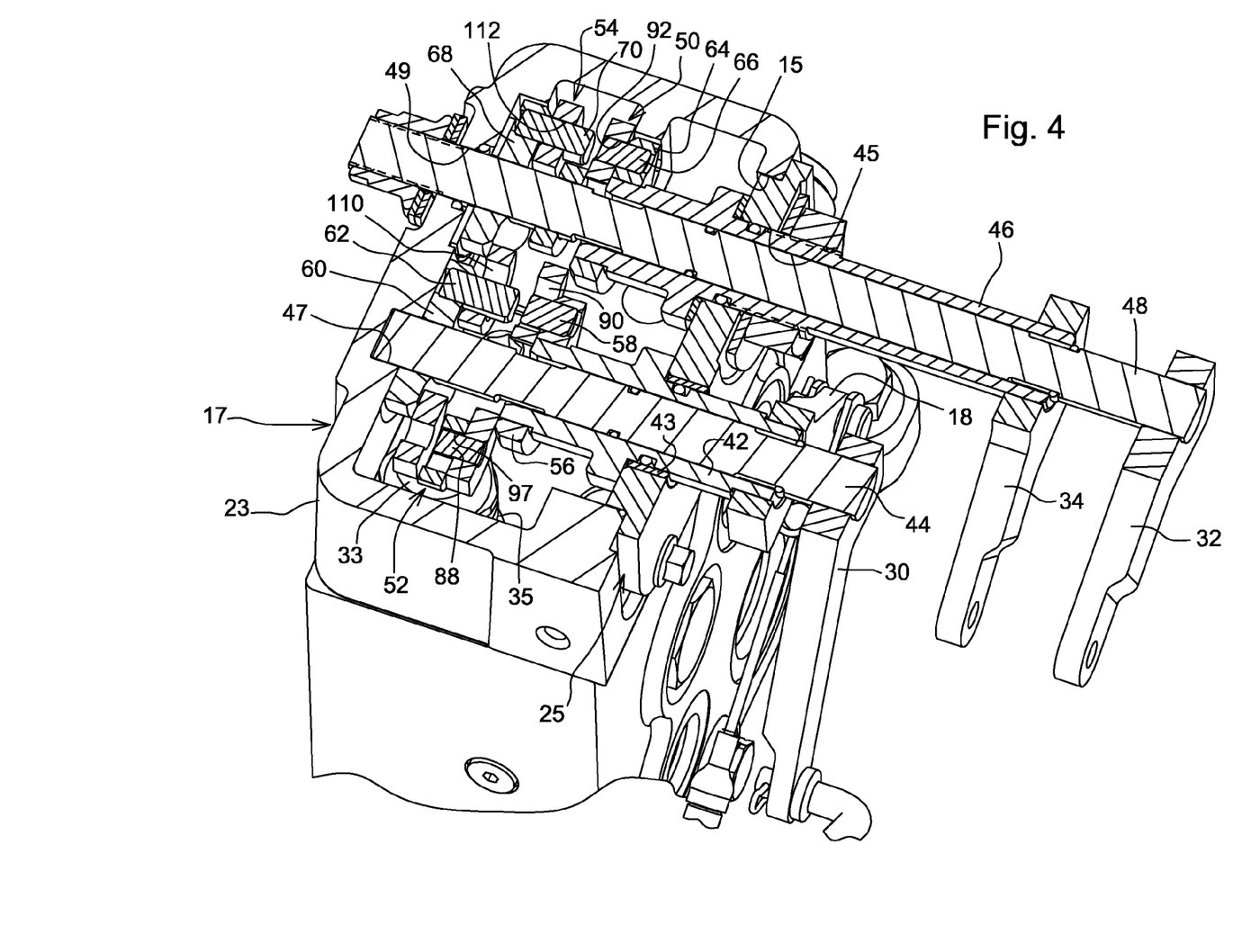
FIG. 4 is a sectional view of the hitch control unit.

Referring now to FIGS. 3 and 4, housing 17 rotatably supports a hollow sensed draft input sleeve 42, a sensed position input shaft 44, an operator controlled draft force setting hollow sleeve 46 and an operator controlled position setting shaft 48. Lever 18 is non-rotatably fixed to an outer end of sleeve 42. Lever 30 is non-rotatably fixed to an outer end of shaft 44. Lever 34 is non-rotatably fixed to an outer end of sleeve 46. Lever 32 is non-rotatably fixed to an outer end of shaft 48. Shaft 44 is rotatably received by sleeve 42. Shaft 48 is rotatably received by sleeve 46. Shaft 44 and sleeve 42 are rotatably received by a bushing in side plate 25. Shaft 48 and sleeve 46 are rotatably received by an aperture 45 in side plate 25. An end of shaft 44 is received by a blind bore 47 in a wall of housing 17. An end of shaft 48 extends through a bore 49 in a wall of housing 17. Side plate 25 is attached, such as by bolts, to the main housing 23.

Hitch control unit 20 also includes a draft cam 50, a draft pickup cam 52 and position cam 54. Draft pickup cam 52 is positioned between cam 50 and cam 54. A lever 56 with a pin 58 is non-rotatably attached to an inner end of sleeve 42. A lever 60 with a pin 62 is non-rotatably attached to an inner end of shaft 44. A lever 64 with a pin 66 is non-rotatably attached to an inner end of sleeve 46. A lever 68 with a pin 70 is non-rotatably attached to an inner end of shaft 48. The ends of only draft cam 50 and of position cam 54 are engagable with an upper surface of hitch valve spool 33. Draft cam and position cam 54 must have the same profile in order to actuate spool 33 in the same manner.

Figures 5, 6:
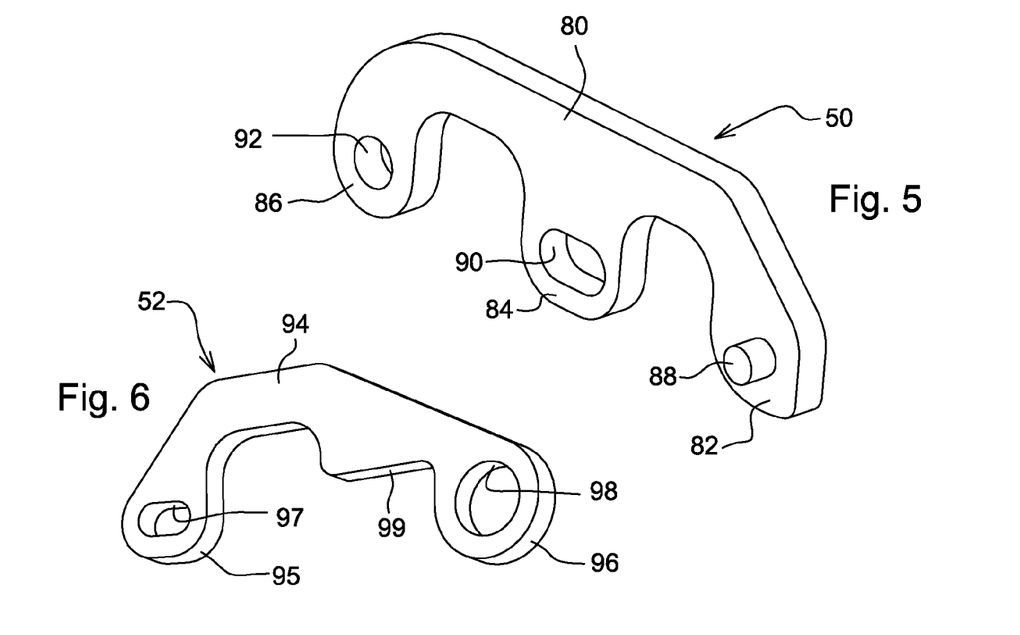
FIG. 5 is a perspective view of the draft cam of FIGS. 3 and 4.
FIG. 6 is a perspective view of the draft pickup cam of FIGS. 3 and 4.

As best seen in FIG. 5, draft cam 50 includes a base 80 from which project arms 82, 84 and 86. A pin 88 projects from arm 82. An elongated hole 90 extends through arm 84 and slidably receives pin 58. A circular bore 92 extends through arm 86 and rotatably receives pin 66.

As best seen in FIG. 6, draft pickup cam 52 includes a base 94 from which project arms 95 and 96. An elongated hole 97 extends through arm 95 and slidably receives pin 88. A circular bore 98 extends through arm 96 and rotatably receives shaft 48. A shoulder surface 99 is formed between arms 95 and 96.

Figure 7:
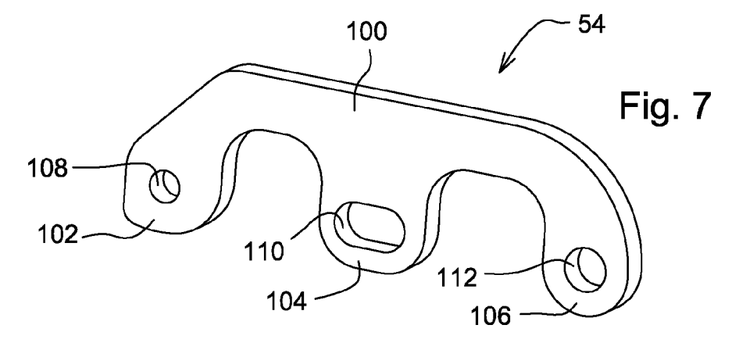
FIG. 7 is a perspective view of the position cam of FIGS. 3 and 4.

As best seen in FIG. 7, position cam 54 includes a base 100 from which project arms 102, 104 and 106. A circular bore 108 extends through arm 102. An elongated hole 110 extends through arm 104 and slidably receives pin 62. A circular bore 112 extends through arm 106 and rotatably receives pin 70. Draft pickup cam 52 is positioned between cam 50 and cam 54.

Figures 8, 9:
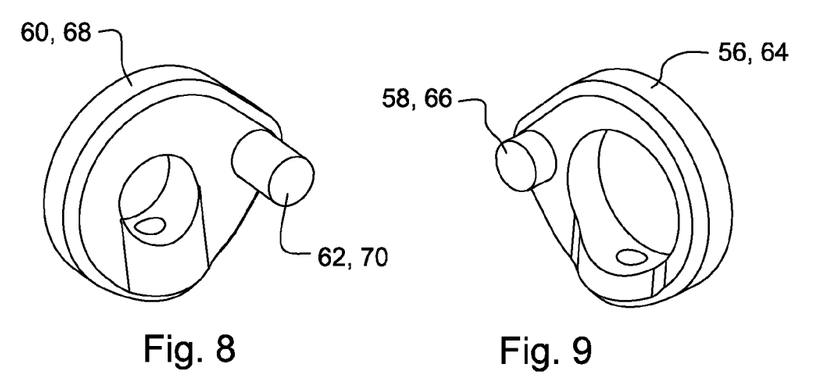
FIG. 8 is a perspective view of two of the levers of FIG. 4.
FIG. 9 is a perspective view of another two of the levers of FIG. 4.

As best seen in FIG. 8, lever 60 includes a shaft bore and a projecting pin 62, and lever 68 includes a shaft bore and a projecting pin 70.

As best seen in FIG. 9, lever 56 includes a hollow body with a shaft bore and a projecting pin 58, and lever 64 includes a hollow body with a shaft bore and a projecting pin 66.

Figure 10:
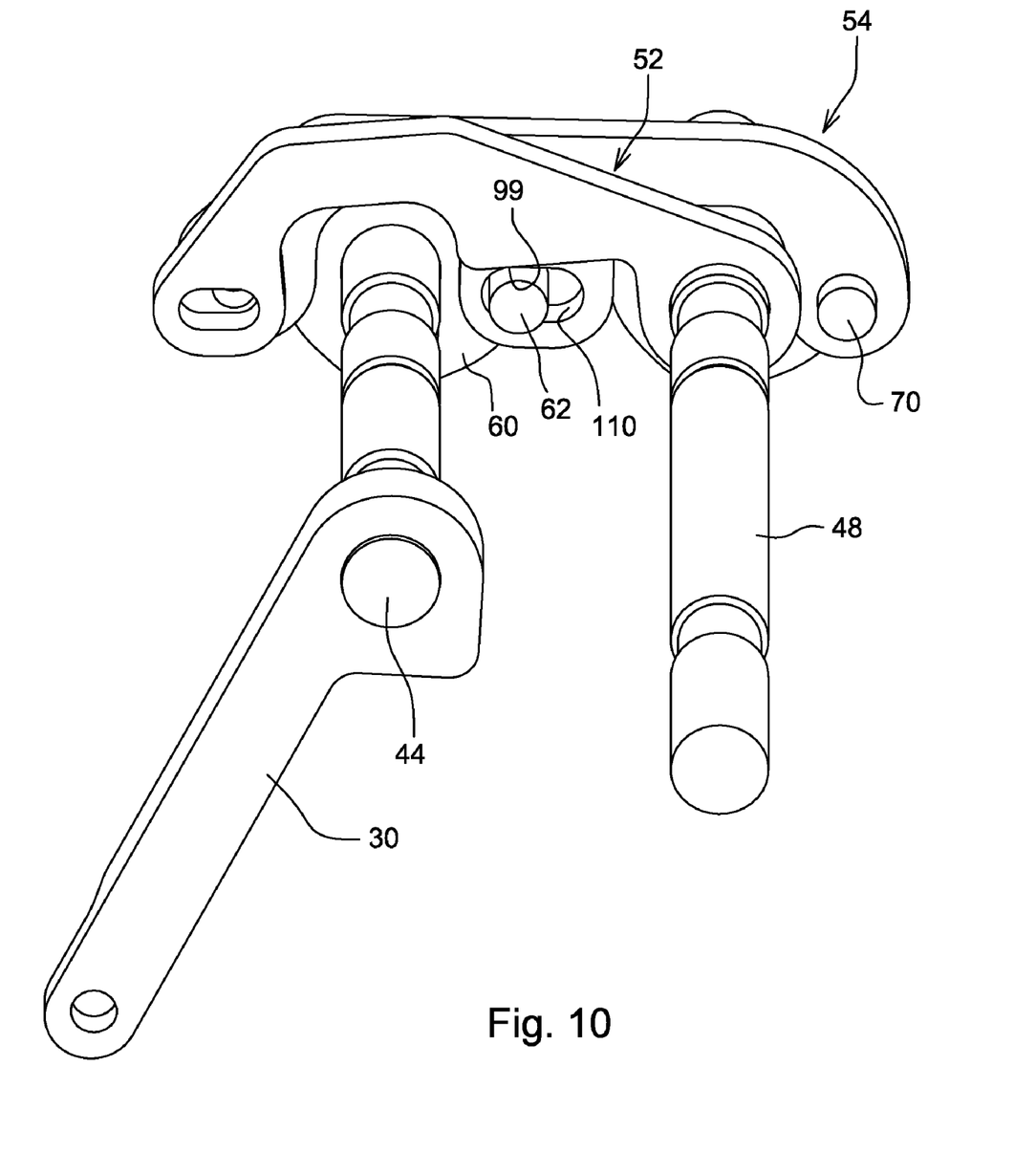
FIG. 10 is a perspective view of part of the assembly of FIG. 4 with parts removed for clarity.

As best seen in FIGS. 4 and 10, pin 58 is received by aperture 90 of draft cam 50. Pin 62 extends through aperture 110 of position cam 54 and is engagable with shoulder surface 99 of draft pickup cam 52. Pin 66 is rotatably received by bore 92 in draft cam 50. Pin 70 is rotatably received by bore 112 of position cam 54. Pin 88 is rotatably received by aperture 97 of draft pickup cam 52.

With this assembly, the shafts 44, 48, sleeves 42, 46, cams 50, 52 and 54 and levers 54, 56, 60 and 64 can be assembled outside of the main housing 23 together with side plate 25. Then this assembly can be inserted into the main housing 23 though the opening in the side of main housing 23. Then the side plate 25 is bolted to the main housing 23 and the assembly is complete.

On the hitch valve spool 33, the neutral no-flow position is at a point where the spring 35 is slightly compressed, thus a spring force is pushing back on the cams 50 or 54. When commanding a hitch raise the spool is pushed further down against spring compressing it further, but when commanding a hitch lower the spool valve is allowed to be moved upward by the spring force, and as the spring decompresses, the force pushing back on the cams 50 or 54 is less. When the operator sets the position or draft force levers, 32 or 34, then cams, 50 or 54, move the spool against the spring, so a method is required to hold the levers/shafts/cams in place and not allow the spring to push the lever back. In other words, in the cab the operator moves the position lever (not shown) rearward to move the hitch, but if a mechanical method was not in place to resist or hold the spring force, then the lever in the cab would spring back forward once the operator removed their hand from lever. A nylon lock-nut on shaft 48 with Belleville spring washers and the staked lock-nut on sleeve 46 with Belleville spring washers are then tightened/torqued to create just enough shaft/lever torque resistance, via clamping force, to not allow the spool valve spring 35 to reposition the operator's lever setting. The result is a small, compact, inexpensive, and simple to adjust control box assembly.

When the operator hitch position setting changes, this results in a rotation of position setting shaft 48 and a pivoting of lever 68 and pin 70. The pivoting of lever 68 pivots cam 54 about pin 62. The end of cam 54 which engages spool 33 then causes spool 33 to direct oil flow in a direction which causes the hitch to move the lift arms 22 and 24 to change the hitch position as commanded by the operator.

When the position of the lift arms 22 and 24 changes, this results in a rotation of position sensor shaft 44 and a pivoting of lever 60 and pin 62. The pivoting of lever 60 pivots cam 54 about pin 70. The end of cam 54 which engages spool 33 then moves spool 33 to slow and then stop oil flow as it reaches the neutral no-flow position, where the lift arms 22 and 24 have reached the new position.

When the operator draft force setting changes, this results in a rotation of draft setting sleeve 46 and a pivoting of lever 64 and pin 66. The pivoting of lever 64 pivots cam 50 about pin 58, which in turn, through pin 88, pivots draft pickup cam 52 about shaft 48. The end of cam 50, is then moved either farther from or closer to the spool valve 33 contact surface, and depending on the sensed draft force input from lever 56 and pin 58, which also moves cam 50 to pivot about pin 66, will allow the sensed draft force input to have cam 50 push down on spool 33. In other words, the draft force setting places cam 50 within range or out of range of engaging spool 33 as the sensed draft force input also moves cam 50 about pin 66.

When the draft force which is applied to the ends of bar 12 increases, and by pivoting on the crowns of tapered bushings 12*b*, this moves the central portion of bar 12 to the right viewing FIG. 1. This rotates lever 14 counterclockwise and pulls cable 16 to the left. This results in a clockwise rotation or pivoting of lever 18 and draft sensor sleeve 42, lever 56 and pin 58. Viewing FIG. 4, the pivoting of lever 56 pivots cam 50 counterclockwise about pin 66, which in turn moves pin 88 and the end of cam 52 downwards. Cam 52 always follows with cam 50 as stated, but cam 52 never contacts spool 33, cam 52 only contacts pin 62 when required as described later. The end of cam 50 moves spool 33 downwards and causes the hitch control valve 21 to direct oil to raise the lift arms, thus reducing the sensed increase in the draft force.

When the hitch is lowered to its lowest position, the position feedback lever 30 will be rotated clockwise as far as possible, viewing FIG. 4. This rotates lever 60 and positions pin 62 farthest from shoulder surface 99 of draft pickup cam 52. During a draft sensing input event, the hitch raises as described earlier, lever 60 rotates counterclockwise and pin 62 engages shoulder surface 99 of pickup cam 52 and lifts the draft pickup cam 52. This lifts pin 88, which is received by aperture 97 of draft pickup cam 52. Pin 88 lifts the draft cam 50, causing the draft cam 50 to lift away from the valve spool 33, where sprig 35 pushes spool 33 back up to neutral position to stop oil flow, stopping hitch raise, and continues to push up into spool valve position that starts to lower the hitch.

During purely position control, the position cam 54 is moved by either operator input lever shaft 48 or hitch position feedback lever shaft 44. The operator commands a position, raising or lowering the valve actuator 33 away from neutral via position cam 54, and then the feed back link 26, 28 attached to rockshaft lift arms 22, 24 moves the same position cam 54 back to neutral (spool valve back to neutral), stopping the raise or lower of hitch.

During purely draft control, the draft cam 50 is moved by either operator input lever shaft 46 or draft sensing feedback lever shaft 42. With the hitch position commanded to be fully lowered (position lever (not shown) in cab pushed full forward) moving shaft 48 fully counterclockwise, then the operator, using a separate cab draft lever, sets the draft cam 50 at a position above spool 33 relative to a certain amount of draft load allowed. At this point cam 50 is not in contact with spool 33, until shaft 46 is positioned fully counterclockwise where the lightest draft loads are required to raise the hitch, or as shaft 46 is moved further clockwise then cam 50 is placed farther from spool 33 where higher draft loads are required to raise the hitch. With shaft 46 rotated fully clockwise, the draft control is considered turned off where a draft load beyond tractor capability is required to raise the hitch. Depending on the setting of shaft 46 within its rotational range, then hollow shaft 42 is required to rotate more for heavy draft loads or rotate less for light draft loads to get cam 50 to come in contact with spool 33 and push spool down to position to direct oil to raise the hitch. The draft load on the lower draft links 11 flexes the draft sensing shaft 12, moves the follower lever 14 and cable 16, thus moving lever 18, which moves the draft cam 50 down, pushing down on the spool valve actuator 33, raising the hitch. As the hitch raises, the draft load decreases, relaxes draft sensing shaft 12 and cable 16, allowing spool valve spring 35 to push hitch control valve spool 33 back up past neutral to lower the hitch and increase draft load again. This cycle repeats for each draft event. Any draft load not reaching the draft control setting will not actuate the hitch.

The draft cam 50 and the position cam 54, having the same profile, act independently while engaging the top of the spool valve spool 33 only if operating purely in position or purely in draft mode, and draft pickup cam 52 will only interact between cam 50 and 54 with a full hitch raise. But when operating in a combination of hitch position above full lower with draft control, then the draft pickup cam 52 comes into play more frequently because pin 62 is positioned closer to surface 99 of draft pickup cam 52. The draft pickup cam 52 is coupled to the draft cam 50, never comes in contact with top of spool 33, and follows the draft cam 50 movement because of pin 88. From a large draft event, via the draft sensing feedback where sleeve 42 rotates clockwise, the draft cam 50 will raise the hitch (push down on spool 33) to decrease draft load, but since the hitch lift arms 22, 24 are now moving then the position cam 54 will move up off the valve spool 33 due to position feed back shaft 44 moving lever 60, and then the position feedback lever 60, via pin 62, will contact the draft pickup cam 52 at surface 99, and lift both cam 52 and cam 50, allowing the spool 33 to move up via spring 35 force, past neutral no-flow position to lower the hitch, and allow the hitch control valve 21 to lower the hitch back to controlled position and/or draft depth. During the draft event cycle, the position feedback lever pin 62 will stop contact with draft pickup cam 52 once the hitch has reversed directions and starts to lower again. As the hitch lowers it will either raise again if another large draft load event occurs, or if the next draft load does not exceed setting, then hitch will continue to lower to controlled set position via position feed back and stop hitch movement when valve spool 33 reaches neutral no-flow position.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A mechanical hitch control unit, comprising:
   a hitch control valve spool;
   a draft force sensing input member;
   a hitch position sensing input member, one of said sensing input members being received concentrically by the other sensing input member;
   a draft force setting input member;
   a hitch position setting input member, one of said setting input members being received concentrically by the other setting input member;
   a draft cam coupled to the draft force sensing input member and to the draft force setting input member;
   a position cam coupled to the position setting input member and to the hitch position sensing input member; and
   a draft pickup cam coupled to the draft cam and pivotally mounted on the hitch position setting input member, the draft pickup cam being between the draft cam and the position cam, the draft cam and the position cam being operatively engagable with the valve spool.

2. The hitch control unit of claim 1, further comprising:
   a lever attached to the hitch position sensing input member; and
   a pin projecting from the lever, the pin extending through an opening in the position cam, and the pin being engagable with a surface of the pickup cam.

3. The hitch control unit of claim 1, further comprising:
   a lever attached to the hitch position sensing input member; and
   a coupling member projecting from the lever, the coupling member extending past the position cam, and the coupling member being engagable with a surface of the pickup cam.

4. The hitch control unit of claim 2, wherein:
   a further pin projects from the draft sensing cam, the further pin being rotatably received by an aperture in the pickup cam, and when the hitch position sensing input member is rotated when the hitch raises, the lever raises the pin, the pin moves the pickup cam and the further pin, and the further pin moves the draft sensing cam away from the valve spool.

5. The hitch control unit of claim 3, further comprising:
   a housing enclosing the cams and a portion of the input members, the housing comprising a main housing having an opening in a side thereof and a side plate removably attached to the main housing to cover said opening, the input members being inserted through the side plate, and the cams and levers being assembled together with the input members before the assembled cams, levers and input members are installed into the main housing.

6. In a hitch control system for a utility vehicle having a hitch with upper and lower links, the hitch control system having draft force sensing member, a mechanical hitch control unit, a hitch valve spool, and a linkage for transmitting a draft force signal from the sensing member to the hitch control unit, the improvement wherein:

the draft force sensing member is coupled to the lower links;

the linkage comprises a cable; and the hitch control unit comprises a draft cam coupled to the draft force sensing member and coupled to a draft force setting member, a position cam coupled to the position setting member and coupled to a hitch position sensing member, and a draft pickup cam coupled to the draft cam and pivotally mounted on the hitch position setting member, at least one of the cams being operatively engagable with the hitch valve spool.

7. The hitch control system of claim 6, wherein:

the draft pickup cam is positioned between the draft cam and the position cam.

8. The hitch control unit of claim 6, wherein:

the parameter sensing input members comprise a draft force sensing input member and a hitch position sensing input member, one of said sensing input members being received concentrically by the other sensing input member; and the parameter setting input members comprise a draft force setting input member and a hitch position setting input member, one of said setting input members being received concentrically by the other setting input member.

9. The hitch control unit of claim 6, wherein:

the draft cam and the position cam are operatively engagable with the valve spool.

10. The hitch control unit of claim 7, wherein:

the draft pickup cam has a bore through which extends the hitch position setting input member.

* * * * *